Figure 1:
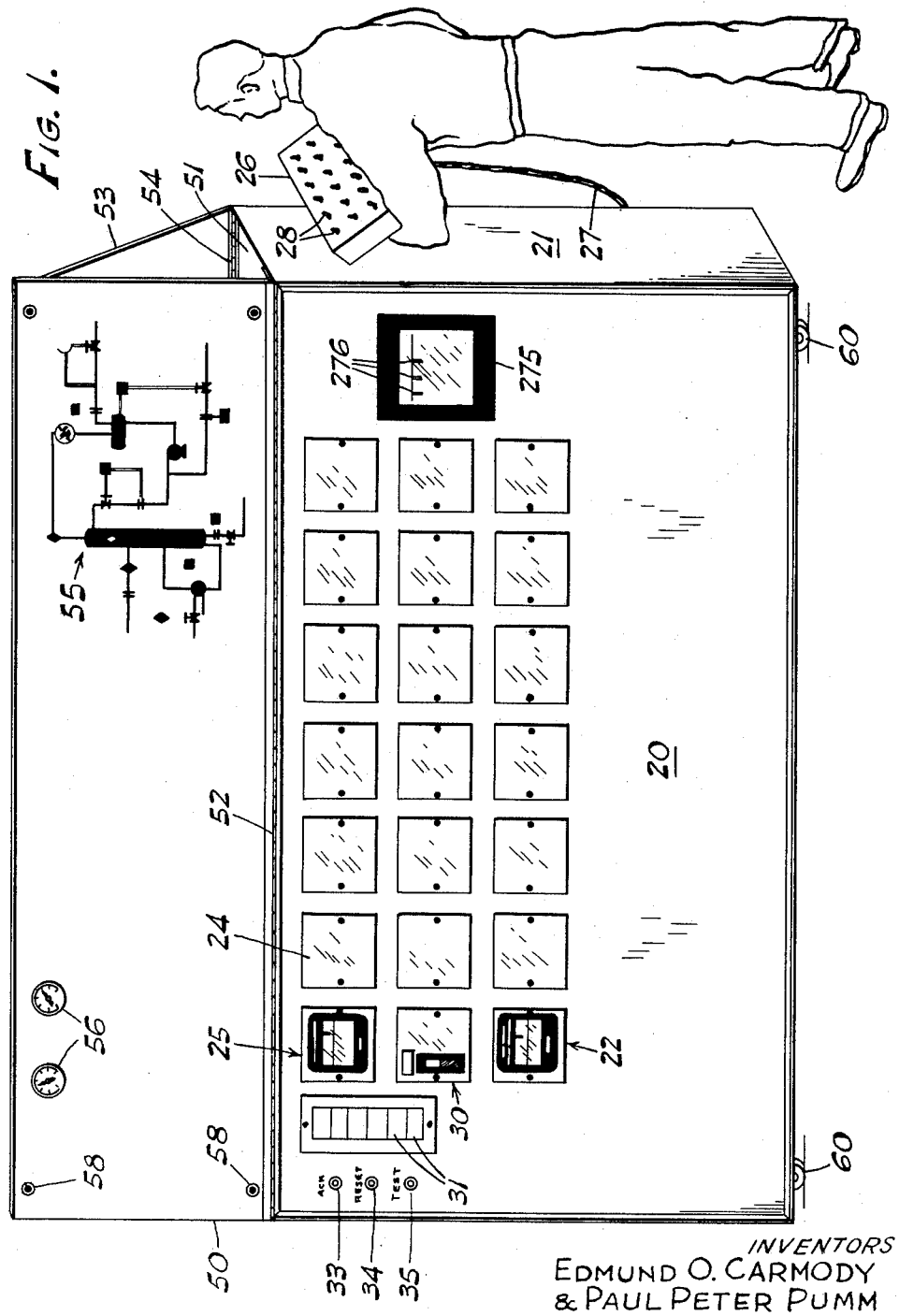

Sept. 1, 1964 E. O. CARMODY ETAL 3,146,533
PERSONNEL TRAINING APPARATUS
Filed Oct. 18, 1962 7 Sheets-Sheet 2

INVENTORS
EDMUND O. CARMODY
BY & PAUL PETER PUMM

Christel + Bean
ATTORNEYS

INVENTORS
EDMUND O. CARMODY &
BY PAUL PETER PUMM

Christel & Bean
ATTORNEYS

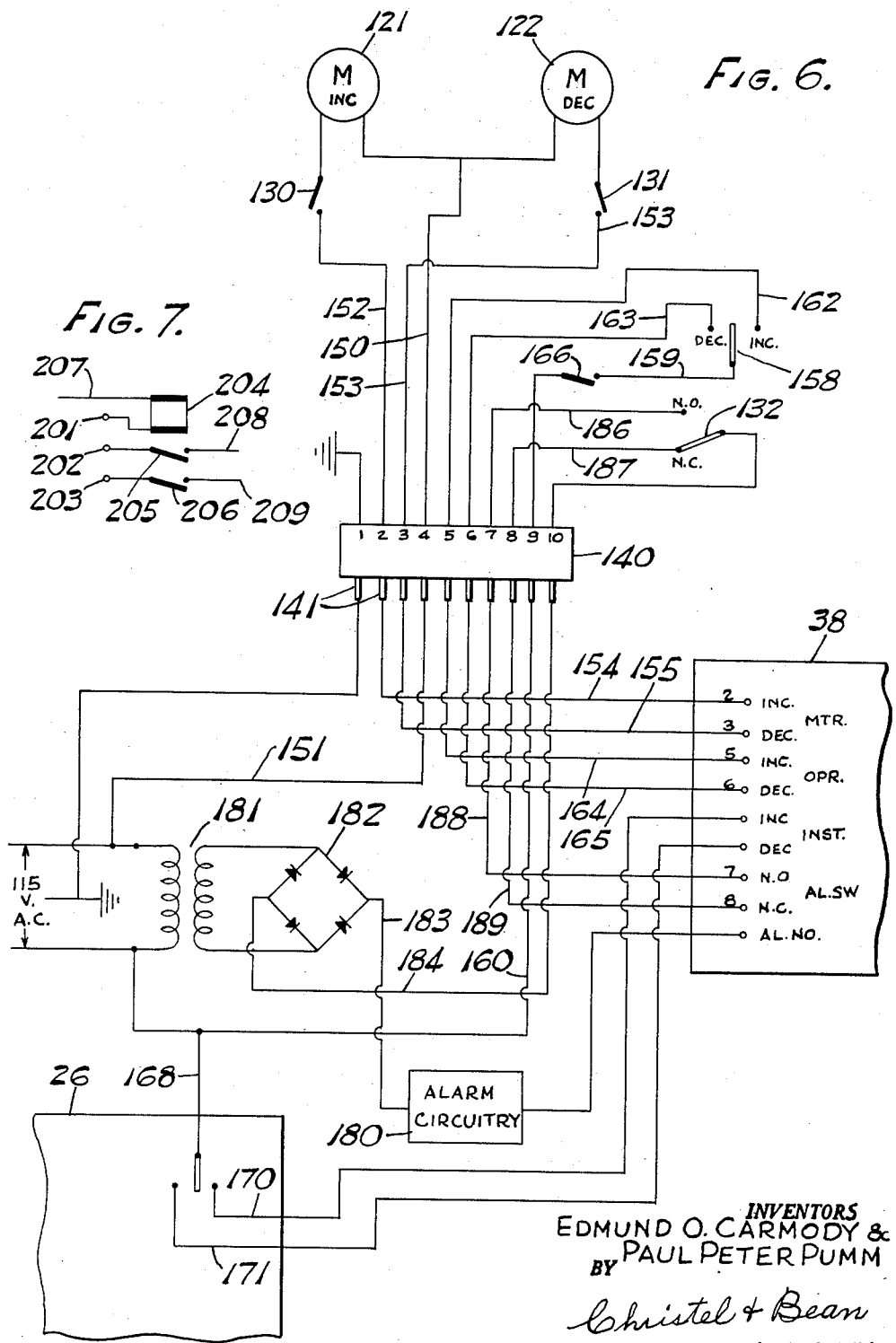

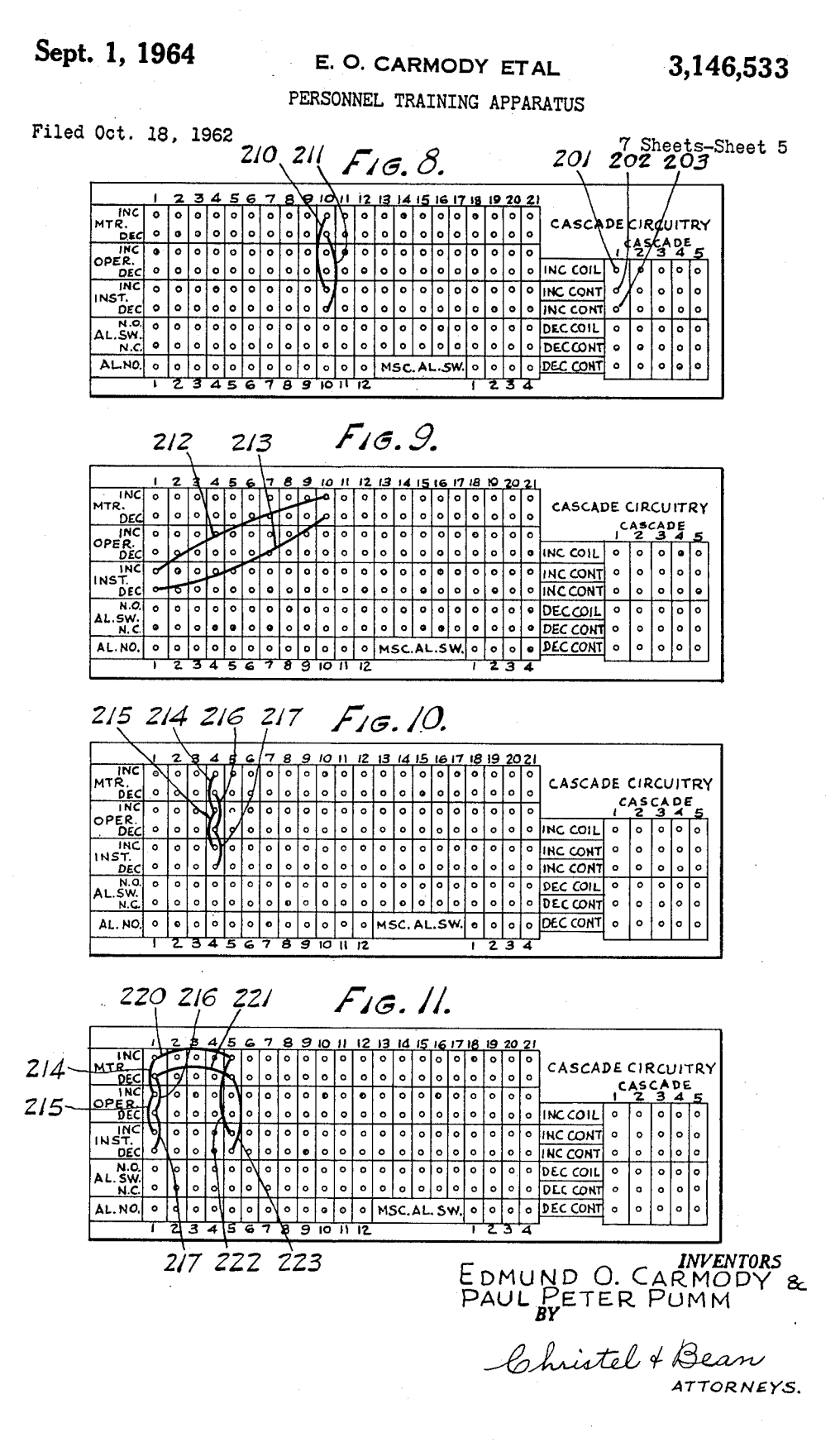

Sept. 1, 1964     E. O. CARMODY ETAL     3,146,533

PERSONNEL TRAINING APPARATUS

Filed Oct. 18, 1962     7 Sheets-Sheet 5

INVENTORS
EDMUND O. CARMODY &
PAUL PETER PUMM
BY
Christel & Bean
ATTORNEYS.

Figures 12, 13, 14, 15:
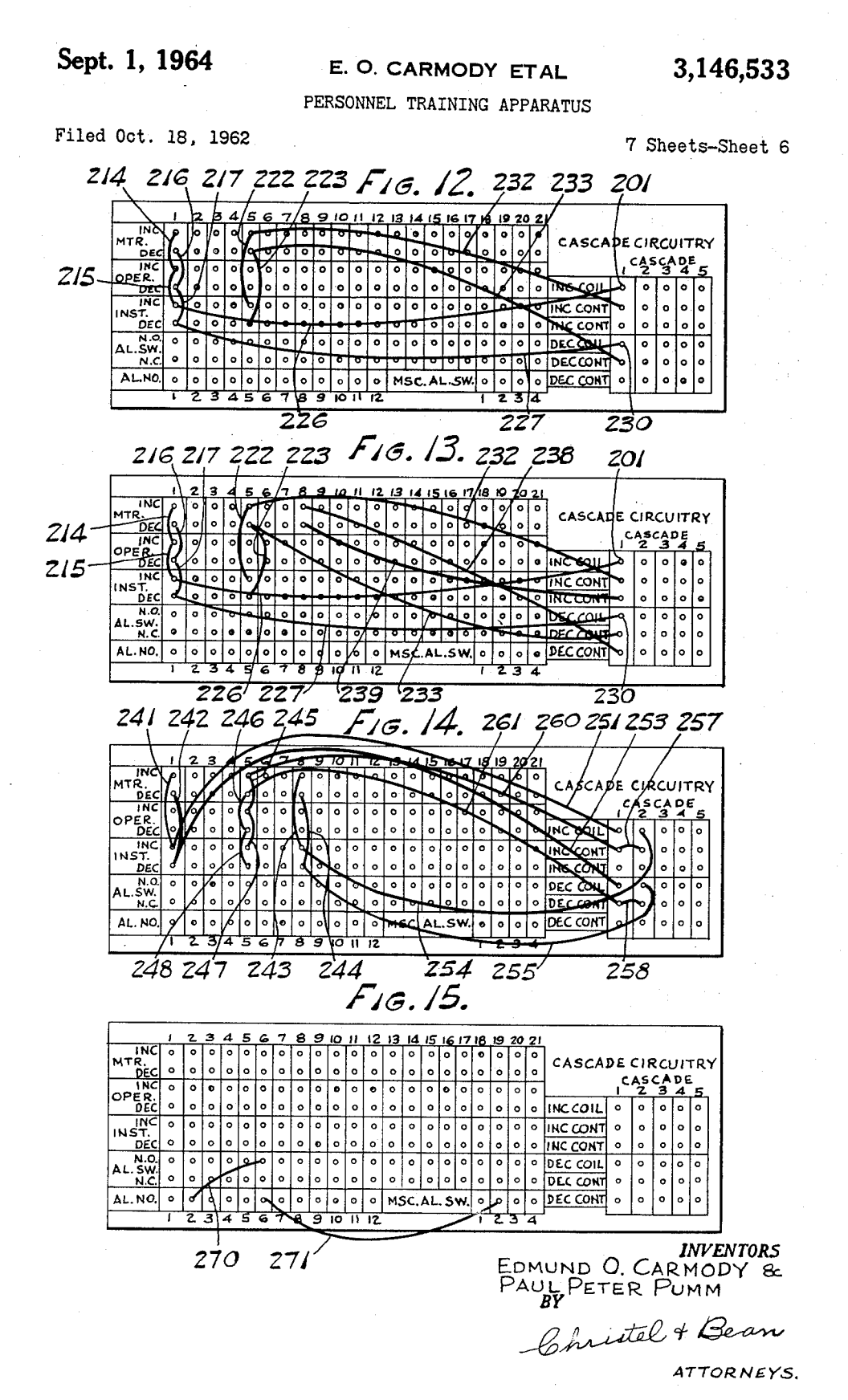

Sept. 1, 1964

E. O. CARMODY ETAL 3,146,533

PERSONNEL TRAINING APPARATUS

Filed Oct. 18, 1962

INVENTORS
EDMUND O. CARMODY &
PAUL PETER PUMM
BY

*Christel & Bean*

ATTORNEYS.

Sept. 1, 1964     E. O. CARMODY ETAL     3,146,533
PERSONNEL TRAINING APPARATUS

Filed Oct. 18, 1962     7 Sheets-Sheet 7

INVENTORS
EDMUND O. CARMODY
& PAUL PETER PUMM
BY
*Christel & Bean*
ATTORNEYS

United States Patent Office 3,146,533
Patented Sept. 1, 1964

3,146,533
PERSONNEL TRAINING APPARATUS
Edmund O. Carmody, Tonawanda, and Paul Peter Pumm, Buffalo, N.Y., assignors to Carmody Corporation, Buffalo, N.Y.
Filed Oct. 18, 1962, Ser. No. 231,529
12 Claims. (Cl. 35—10)

This invention relates to training apparatus and particularly to apparatus for training personnel in the operation, control and maintenance of processing apparatus, chemical plants, petroleum plants, power generating plants, food processing plants and many other applications which involve training of personnel in the management and control of processes and operating procedures.

An important feature of the apparatus of the present invention resides in its versatility and diversity of use and application to training problems which exist or arise in many industrial and other fields. Although the use of the apparatus is by no means thus limited, an example of its application is the training of personnel in the operation of chemical plants wherein many control operations are performed, in the chemical plant itself, from a central control point, the controls being effected from such central point in accordance with instruments at the control station which indicate and record conditions at many remote points in the chemical plant. Alternatively, the instruments simulated by the present apparatus may, in the plant itself, be located variously about the plant at separate control or observation points. The various conditions indicated by the instruments may include temperatures, pressures, flow-rates, levels, electrical readings and various other values, conditions, and criteria which require adjustment of controls at a control point to maintain proper operating conditions of a process or procedure.

Probably the most common field of use of training devices in the prior art has been in aeronautical training wherein the training apparatus simulates various flight conditions and problems arising in the control and operation of aircraft. Training devices generally, whether for aeronautical or other training, have heretofore of necessity been designed and constructed for use in a given training problem or for training personnel in the accomplishment of specific objectives, whether the application be aeronautical, industrial, or otherwise. The apparatus of the present invention is aptly characterized as a universal process trainer since it is designed and arranged so that it may be used for a wide variety of training problems.

A plurality of instruments which simulate various recording instruments of a plant or process installation, while they may employ various scales or charts to simulate the various recording instruments, are functionally similar and interchangeable both as to physical location and as to their connection in the trainer circuitry. Thus a given standard process trainer of the present invention may be set up to simulate any of a wide variety of industrial or other processes by proper selection, distribution and interconnection of standard components.

One form of the present invention shown herein comprises apparatus having a maximum capacity of a given number of standard interchangeable instruments. Another form illustrated generally herein comprises a modular arrangement wherein a basic apparatus having a capacity for accommodating a relatively moderate number of standard instruments may be added to sectionally by means of modules which may be the same as the basic apparatus or may be modified as to capacity and as to the various instrument simulations which it makes available. By thus adding modules to a basic trainer the user may expand his apparatus from a minimum capacity to various larger capacities as the occasion and need arises.

While specific embodiments of the principles of the present invention are illustrated and described herein by way of example, the scope of the present invention is not intended to be limited thereto nor otherwise than as defined in the appended claims.

Figure 2:
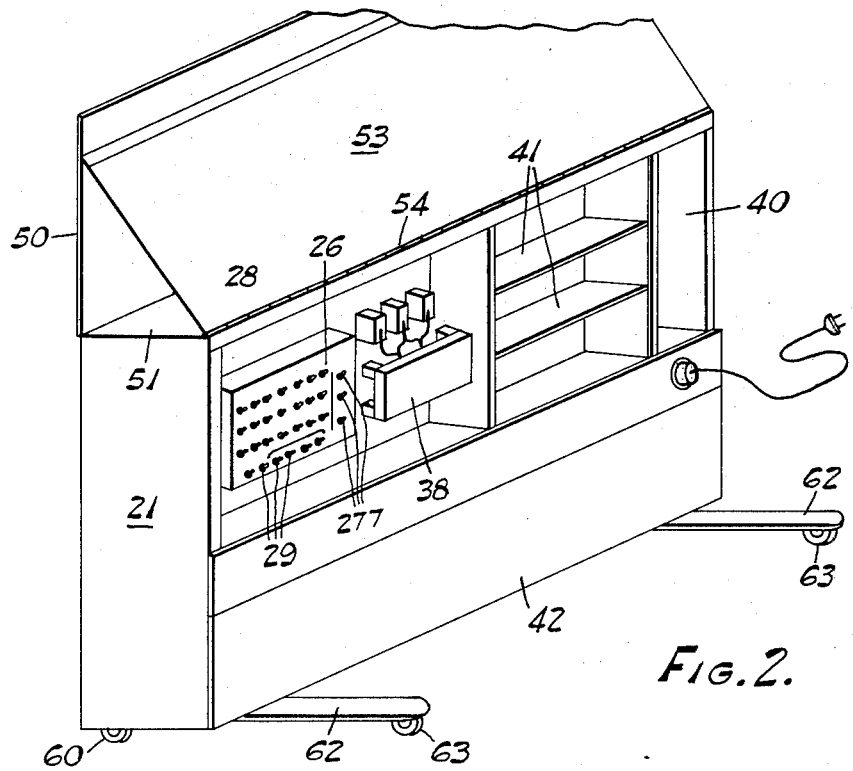
Figure 5:
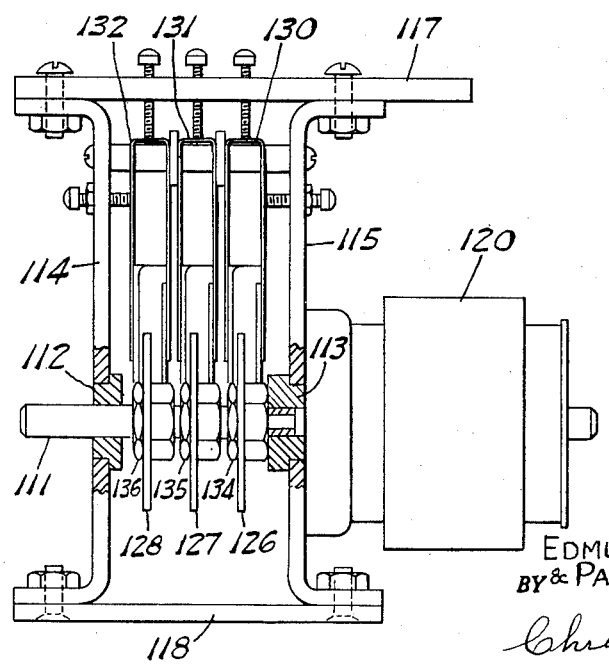
Figure 3:
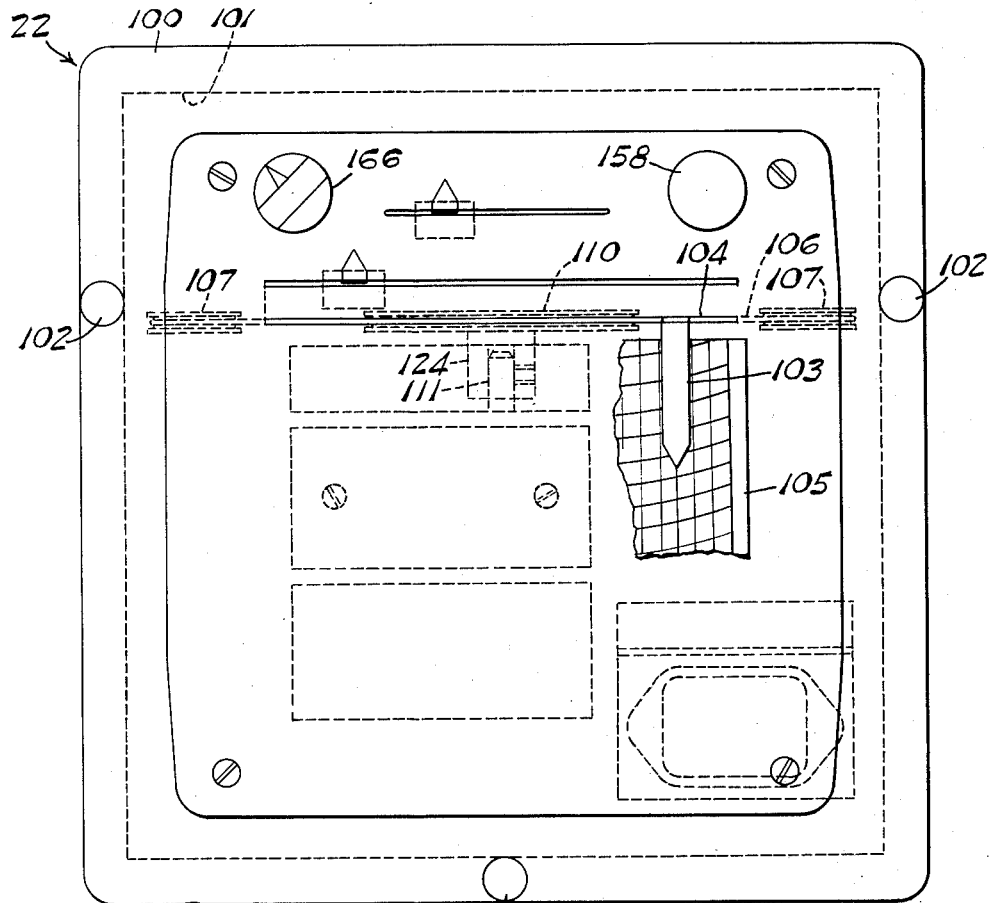
Figure 4:
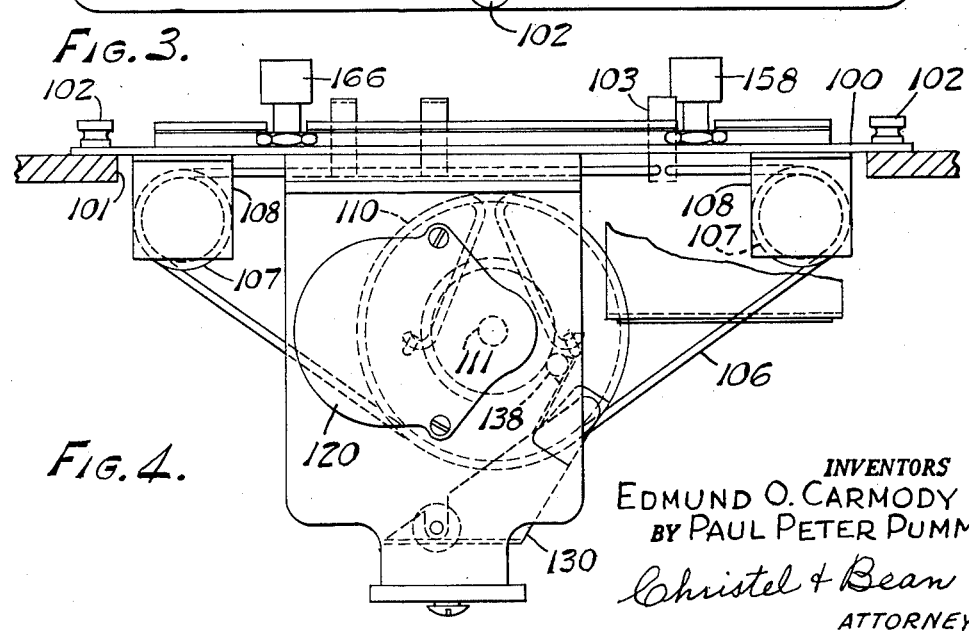
Figure 16:
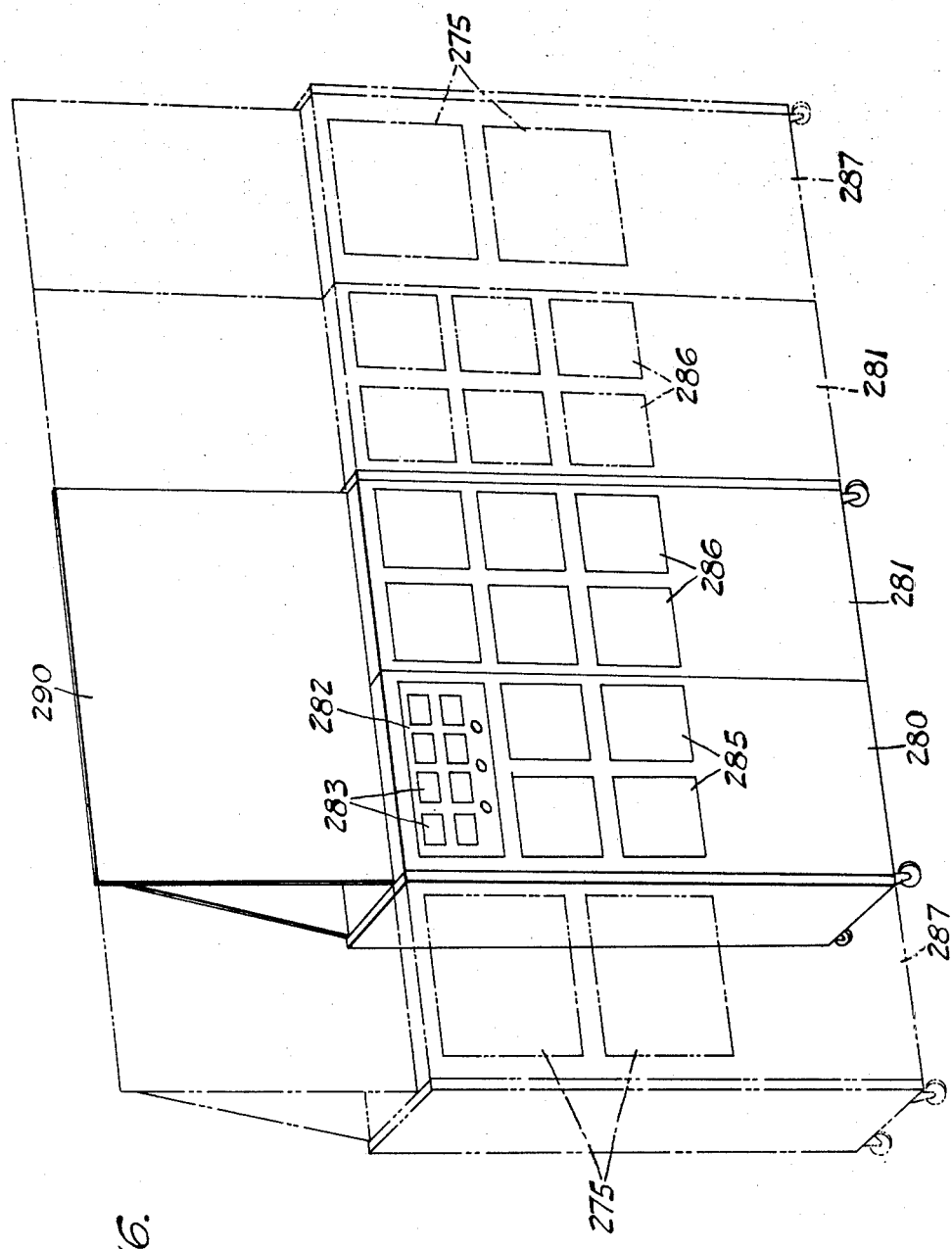

In the drawings:
FIG. 1 is a general front perspective view of one form of the training apparatus of the present invention;
FIG. 2 is a rear perspective view thereof;
FIG. 3 is a front elevational view of one of the recording and indicating units of the apparatus of FIGS. 1 and 2;
FIG. 4 is a bottom plan view of the recording and indicating unit of FIG. 3;
FIG. 5 is a side elevational view of a portion of the mechanism of FIG. 4;
FIG. 6 is a wiring diagram showing electrical circuitry of the recording and indicating unit of FIGS. 3 through 5 and the electrical relationship thereof to other components of the apparatus;
FIG. 7 is a wiring diagram showing a representative portion of the cascade circuitry of the patchboards illustrated in FIGS. 8 through 15;
FIGS. 8 through 15 are elevational views of patchboards or program board elements showing various patch cord arrangements; and
FIG 16 is a general front perspective view of a modified form of the training apparatus of the present invention illustrating a modular support arrangement.

Like characters of reference denote like parts throughout the several figures of the drawings and reference will first be had to FIGS. 1 and 2 for a general description of the construction and arrangement of the training apparatus as a whole. Referring to FIG. 1, the display and cabinet structure there shown comprises a principal front panel member 20 and side walls 21 which form a cabinet which is generally open at its rear side. The panel member may be provided with a variety of recording, indicating, controlling and like instruments or instrument simulations which are arranged to represent a set of conditions obtaining in an industrial process or plant or any other application to which the teaching and training apparatus is to be applied.

In the principal combination of the present invention reference will be had particularly to a plurality of interchangeable recording and controlling units, one of which is designated generally by the numeral 22 in FIG. 1. In the present instance the panel 20 is arranged to receive a maximum of twenty-one instrument-simulating units 22. Any number of instruments 22 within the capacity of panel 29 may be employed and these instruments may be placed in any desired positional arrangement. Positions on panel 20 which are not required to be occupied by an instrument in a given arrangement may be covered by a plate 24 so that the instruments being employed will be more readily spotted by a trainee or by the instructor.

Units 22, as will appear more fully later herein, record changing or changeable values, quantities or other indications under the control of an instructor, the trainee, or by servo operation under the control of other of the units 22. In given adaptations it will be desired that the instrument be controllable only by the instructor or in response to movements or changes in the indications of other instruments, but not by the student or trainee. One such instrument is designated 25 in FIG. 1, and, for convenience, the instruments 22 shall be referred to herein as recorder-controllers and the instruments 25 as recorders.

Recorder instruments of other types and configurations may be employed, such as circular dial indicators and others. Merely by way of an additinoal example, a ribbon type indicator is shown at 30 in FIG. 1 and, apart from the indicating face, the internal mechanism may be arranged to operate the same as a recorder 25.

A portable control console 26 for use by the instructor may be stored as shown in FIG. 2 when not in use and is connected to the apparatus proper by a multiple conductor cable 27 so that the instructor may move about in front of the apparatus and may stand off behind a trainee who is standing directly in front of the panel 20. The instructor's control console contains a number of double throw manual switches 28, one for each of the recorder-controller 22 and the recorders 25. Accordingly, in the present instance twenty-one instructor console switches 28 will be provided, plus such additional switches as may be required for alarm control and additional instruments such as a multi-pen recorder which will be referred to later herein.

It will be noted that the switches 28 on the instructor console are, for convenience of manipulation and observation, arranged in three horizontal rows of seven each, as are the instrument positions themselves on the panel 20. The functional and electrical relationship of these components will be explained more fully later herein. The instructor's console 26 also is provided with alarm switches 29 and may be provided with various other ancillary control elements.

A group of audible and/or visual alarm components, in the present instance six in number, are provided as at 31 on panel 20 and these alarms may be employed in a variety of arrangements. As far as the present invention is concerned, one or more of the several alarms 31 may be associated with selected recorders 25 or recorder-controllers 22 so that a lamp becomes illuminated or an alarm sounds, or both, when given readings are exhibited or limit positions are reached by the indicators of these instruments. In FIG. 1 a group of alarm control switch button 33, 34 and 35 are provided for manipulation by the trainee in conjunction with the alarms 31.

In FIG. 2 the numeral 38 designates generally a readily detachable multiple electrical connector of the patchboard type which cooperates with the exhibiting and controlling elements of the components of panel 20 and the control switches of instructor's console 26 and with other electrical elements of the invention of the present combination in a manner which will be more fully described later herein. The multiple connector 38 provides selectively changeable programming means whereby a particular patchboard or program board may be quickly removed and replaced by another, the removed patchboard being retained for later used when the training problem for which it has been prepared is again to be dealt with.

FIG. 2 further shows a compartment 40 which may be used to house patchboards not then in use or for other purposes, shelves 41 for instrument storage, and an access door 42 for a compartment which houses a multiplicity of general purpose electrical components which enter into the system of the present invention, mainly rectifier diodes and relays.

A display panel 50 is hinged along its lower edge to the upper front edge of the cabinet formed by front panel 20, side walls 21 and a top panel 51. A hinge for display panel 50 is designated 52 in FIG. 1 and the display panel is held in its erect operative position by a rear bracing panel 53 which is hinged along its lower edge to the rear edge of the top panel 51 as at 54. Panel 50 is preferably of steel or other magnetically permeable material and in the present instance is provided with a ceramic or porcelainized surface to provide a surface which is relatively proof against scratching or other surface damage.

Speaking generally, display panel 50 may be used in various ways to exhibit information and indicia related to and coordinated with the instrumentation of instrument panel 20. Most commonly display panel 50 may bear a flow diagram or other diagrammatic information relating to the process or procedure which the apparatus is set up to embody or represent, with appropriate numerical, symbolic or other references paralleling the instruments on panel 20 which are involved in the process or procedure. In the instance illustrated in FIG. 1 a flow diagram 55 is shown and the various components thereof will be numbered or otherwise identified to correspond to representational instruments such as the instruments 22 and 25 and others which may be associated with the instrument panel 20.

In the present instance, since the steel display panel 50 is provided with a ceramic surface, the instructor may inscribe with a grease pencil any desired diagrammatic indicia such as a flow diagram or other information or modifications or corrections of a diagram which may be more permanently displayed on the panel 50. Due to the magnetic permeability of the panel various symbolic elements such as the manually movable pointers designated 56 in FIG. 1, which include permanent magnets, may readily be attached to the panel at any desired point by merely placing them at any desired location. Various other standard symbols such as columns, valves, pumps, condensers, etc. may be provided.

Where desired a drawing or print of or related to a given process or procedure may be separately attached to the panel 50 as by means of magnetic blocks and fasteners 58 are provided so that additional panels or panel sections similar to panel 50 may be applied as needed and removed and retained for future reuse.

Any desired attachment means may be provided for removably attaching the upper edge of brace panel 53 to the upper rear portion of display panel 50 and when these panels are detached display panel 53 swings rearwardly and downwardly to enclose the compartment containing the instructor's console 26 and programming connector 38 as well as the storage compartments 40 and 41. The display panel 50 swings forwardly and serves as a cover for the portion of front panel 20 which is normally given over to the instruments 22 and 25 and others.

The entire apparatus is readily movable. The lower front corners are provided with castors 60 having conventional wheel locks to retain the apparatus solidly in position at a given location. Arms 62 pivoted to the underside of the apparatus swing out rearwardly as shown in FIG. 2 and are provided with castors 63 to provide a broad and substantial supporting base for the apparatus.

Reference will now be had to the construction and arrangement of a single indicator unit 22 of the recorder-controller type. As indicated earlier herein the instruments 22 and 25 are used in a great variety of combinational arrangements and connections with other like instruments and comprise the core or operational framework of the training apparatus of the present invention. In this connection reference will be had particularly to FIGS. 3, 4 and 5. Speaking generally, the indicators which are the subject of discussion in this portion of the specification are mainly of two general types previously identified as record-controllers 22 and recorders 25. However, since the latter type differs from the former only in omitting certain elements thereof, a description of the complete indicator shown in FIGS. 3, 4 and 5 will convey a full understanding of both types. Also, it will be noted that other forms of instruments such as the ribbon type indicator 30 may be employed instead of one or more of the recorders 25.

A general front support plate member 100 is detachably secured in position in an opening 101 in the main front panel 20 of the apparatus as by screws 102. In the form of indicator described herein by way of example an indicating pointer 103 is mounted to move along a slot 104 to indicate particular values on a scale 105. A wide variety of scales 105 may be interchangeably applied to the front of the instrument. Pointer 103 is carried by a cable 106 which passes around a pair of pulleys 107 rotatably attached to brackets 108 attached to the rear of plate member 110 which connects with a power shaft 111 to which further reference will now be had.

Shaft 111 is journaled in a pair of bushings 112 and 113 carried by upper and lower mounting plates 114 and 115 which are attached at their ends to front and rear support plates 117 and 118, thus forming a box structure for supporting the drive portion of the indicator. Front support plate 117 is detachably secured to the rear face of the general front support plate 100 of the indicator unit.

Motor means 120 is attached to the lower side of lower mounting plate 115 for driving shaft 111 and may incorporate therein suitable reducing gearing. The motor means 120 may comprise a direct current reversible motor but in the present instance, merely by way of example, comprises a pair of oppositely rotating A.C. motors mounted axially end to end on a single drive shaft, the electrical arrangement being such that the two motor units may be alternatively energized to drive the pulley 110 and consequently the pointer 103 in one direction or the other. In the functional description set forth later herein the two motor components of the assembly 120 are referred to as "increase" and "decrease" motors and are designated by the numerals 121 and 122, respectively, in the wiring diagram, FIG. 6.

Broadly, the motor means which receives the electrical control impulses and translates them to indicator movements may comprise various prime movers, meter movements or other electrical or electronic translation means.

Motor shaft 111 is detachably connected to a hub 124 on drive pulley 110 and as shown in FIG. 5 it carries a series of three angularly adjustable switch operating cams 126, 127 and 128 which operate corresponding switch mechanisms 130, 131 and 132. The cams 126, 127 and 128 may be of the double laminar type which are selectively adjustable by loosening lock nuts 134, 135 and 136 to adjust the cams so that their lower non-operating portions may be of any desired angular extent and angular disposition relative to the shaft 111.

The switches 130, 131 and 132 may be of the normally closed type adapted to be opened when raised portions of the cams engage the operating members of the switches, one of which is designated 138 in FIG. 4. In the present instance switches 130 and 131 are connected in the energizing circuits for the "increase" and "decrease" motor components 121 and 122, respectively, to open such motor circuits at opposed points along the range of travel of pointer 103 and thus adjustably and automatically limit the movement of the pointer in opposite directions.

Reference will now be had to the wiring diagram, FIG. 6, which shows the electrical relationship between the circuitry of the recorder controller unit 22 of FIGS. 3, 4 and 5 and the remainder of the electrical components of the apparatus of the present invention insofar as those components and the associated circuitry are involved in the general combination of the present invention.

In FIG. 6 the circuitry of one of the recorder-controller units 22 is outlined in dash lines and a multiple plug member 140 carries the ten conductors associated with the unit 22 to the circuitry externally thereof through a series of ten prongs 141 provided for quick attachment of a unit 22 to a receptacle which in turn is adapted for quick plug in connection to a corresponding series of jacks at the patchboard or program board connector 38 and to the terminals of a corresponding double throw switch 28 of the instructor's console 26.

Of the ten leads from the instrument 22, three are power connections and the other seven lead to corresponding terminals at the patchboard unit 38, six more or less directly and one by way of a direct current power supply. These various leads will presently be identified and described in detail with particular reference to FIG. 6, but reference will first be had to FIG. 8 which shows a typical multiple connector component 38 of the patchboard type.

Basically, and as far as we are concerned in this portion of the description, the patchboard or program board 38 is provided with twenty-one vertical rows of jack openings, one for each of the possible total of twenty-one instruments 22 and 25. Each vertical row or tier contains eight jacks and a ninth jack in most of the tiers is provided for connection to an alarm device, although the numbers of the jacks in the lowermost row, which connect with the alarms, do not correspond to the aforesaid twenty-one instrument units 22 and 25, as do the first eight horizontal rows of jacks.

The jacks comprise female electrical connectors which include conductors extending through the patchboard or program board 38 which terminate at the underside of the board, as viewed in FIG. 8, in means for establishing quick electrical connection with the connectors of other jacks of board 38 in a manner and for purposes which will presently be described. Such interconnection at the underside of the patchboard 38 is by means of patch cords or jumper wires. The details of the manner of connection of patch cords to the jack outlets of connectors of this general type are known in the electrical arts.

Certain of the outlet conductors from the unit 22 terminating in the outlet prongs 141 of connector 140 lead to appropriate jacks of a given vertical row of jacks on patchboard 38. By way of example, FIG. 6 illustrates the connections of one such unit 22 with one vertical row of jacks of the patchboard 38, it being understood that by way of various detachable plug and jack type connectors the appropriate leads from the connector 140 of each unit 22 (or similar unit 25) terminate at the patchboard 38 in plugs which are insertable in an appropriate vertical row of jacks on patchboard 38.

Referring now to the wiring diagram, FIG. 6, the increase and decrease motors 121 and 122 have a common conductor 150 which through the connector 140 extends by way of a conductor 151 to one side of a 115 volt alternating current supply. The terminals at the other side of each of the motors 121 and 122 are connected by conductors designated 152 and 153, respectively, to external conductors 154 and 155 to the two motor jacks of a given row of jacks on patchboard 38. It will be noted that the cam controlled switches 130 and 131 are interposed in conductors 152 and 153 for adjustably limiting the movement of the indicating pointer 103 of instrument 22 in opposite directions by opening of such switches when the opposite limit positions are reached.

In FIG. 6 a manual trainee-controlled double throw switch 158 which is located on the face of the instrument 22 is designated 158 and has a power supply connection 159 connecting externally with a conductor 160 which connects with the opposite side of the alternating current power supply from the previously described common motor power connector 151. Switch 158 may be moved by the operator from the neutral position illustrated in FIG. 6 to connect with either of a pair of "increase" and "decrease" conductors 162 and 163 which extend to the two "operator" jacks of the vertical row of jacks of patchboard 38 by way of plug-in connectors 164 and 165, respectively. A manual switch 166 in conductor 159 may be closed or open to render the trainee or operator-control switch 158 operable or inoperable.

A parallel set of manually operable controls for the motors 121 and 122 of each unit 22 is provided on the instructor's console 26 by means of the corresponding previously described manual double-throw switch 28, one such switch being provided for each of the possible capacity of twenty-one instrument units. The common power supply conductor of instructor's console switch 28 is designated 168 and may connect with the power supply in common with the operator's switch power supply conductor 160 as in FIG. 6. Each instructor's switch 28 is selectively movable from its neutral position to engage either of a pair of conductors 170 and 171 which plug into "instructor" jacks of the appropriate row, as shown in FIG. 8.

The manner in which patch cords or jumper wires are connected at the rear of a patchboard or program board 38 to complete the electrical connection of a given instrument 22 and its related trainee and instructor-controlled switches 158 and 28 will be described later herein in conjunction with FIGS. 8 through 15.

The present specific example of the apparatus of the present invention provides six alarm devices 31 which may be of visual or audible type or both combined. Each alarm device 31 may be selectively connected to operate with any one or more of the instruments 22 and 25 and their use is ancillary to the basic combination of the multiple instruments, the alternative operator controls and remote instructor or trainee controls, and the patchboard or program board which interrelates the foregoing elements. Additional alarm devices may be provided as required or desired.

In FIG. 6 an alarm device is represented schematically in block diagram form at 180. The alarm circuitry generally is arranged to operate on 24 volt direct current in the present instance, and accordingly power supply for the alarm circuitry is by way of a transformer 181 and a rectifier bridge circuit 182. One output conductor from the direct current power supply is designated 183 and leads to the alarm circuitry and the other power supply conductor 184 leads through connector block 140 of an instrument 22 and thence through the aforesaid cam controlled alarm switch 132 which moves between terminals of a pair of conductors 186 and 187 and thence back through connector 140 and conductors 188 and 189 which plug into normally open and normally closed alarm switch contact jacks in the given vertical row of jacks on patchboard 38.

Reference has previously been made to recorder units 25 which differ from recorder-controller units 22 only in the omission of the operator or trainee control function and the circuitry necessary therefor. As far as the present description is concerned, it is sufficient to state that the instruments 25 are the same in circuitry as the instrument 22 illustrated diagrammatically in FIG. 6 excepting that the trainee-operated control circuitry provided in instrument 22 for operation at the instrument, including the switch 158, conductors 159, 162, 163, 164 and 165, are omitted.

Previous reference to the jack arrangement of patchboard 38 has been confined mainly to the series of jacks which are connected to the several recorder-controller and recorder instruments 22 and 25 and the instructor's console control switches 28. Reference will now be had to the right-hand portion of a patchboard 38 as shown for instance in FIG. 8, and particularly to the portion thereof marked "cascade circuitry."

As shown in FIG. 8, there are ten groups of three jacks each which, as will presently be seen, are adapted to be associated with a series of ten electromagnetic relays which for convenience of identification and utilization are arranged in two groups of five relays each, five being particularly for instrument "increase" operation and five for "decrease" operation.

FIG. 7 is a fragmentary wiring diagram showing the three jacks at the top of column No. 1 of the cascade circuitry which are typical of the other nine sets of three jacks each in the cascade circuitry. These three jacks are designated in FIG. 7 by the numerals 201, 202 and 203. A standard double pole single throw electromagnetic relay embodying an electromagnet 204 and normally opening switches 205 and 206 which are adapted to be closed thereby is provided for association with each similar group of three jacks in the following manner. One lead from the electromagnet 204, designated 207 in FIG. 7, extends to one side of the A.C. power supply and may for instance be connected at the same point as conductor 151 in FIG. 6. The other side of electromagnet 204 is plugged into the top jack 201 which is identified as the "increase coil" jack in FIG. 8.

One side of each of the two switches 205 and 206 is plugged into each of the next two jacks 202 and 203 which are identified as "increase contacts" in the cascade circuitry. The other side of each of the switches is connected to the A.C. power supply by way of conductors designated 208 and 209. These power connections of conductors 208 and 209 will be to the same side of the power supply as the conductors 160 and 168. Thus each set of three relay jacks may be employed in such manner that a control impulse, as for instance, the closure of one of the instructor switches 28, energizes the electromagnet 204 of a relay unit and closes either one of two appropriately connected patchboard circuits through the switches 205 and 206 which are represented on the patchboard cascade circuitry by the jacks 202 and 203.

The cascade circuitry relays are employed so that a connection may be established whereby, for instance, one instrument may be controlled and operated from another instrument when such other instrument is operated but the connections for producing this result will not operate reversely to energize the other instrument upon operation of the one instrument. In other words, a master and slave relationship is established which avoids a feedback to the master unit when the slave unit is operated. The general manner in which any of the ten relay components, which are thus made available for patch cord connection with the instrument circuitry, may be employed will become evident from certain of the typical patch cord connection arrangements to be described later herein particularly in conjunction with FIGS. 12 through 15.

Reference will now be had to representative patch cord or jumper wire connections which are made at the underside of patchboard or program board 38 to effect typical more or less standard control relationships and, in some cases, typical control relationships between a plurality of instruments. For simplicity of understanding the patch cord connections of one instrument or of merely two or three instruments are shown to illustrate various elementary electrical relationships but it is to be understood that in a given patchboard arrangement or program set-up a great many patch cord or jumper wire connections will be provided to properly connect any number of instruments within the capacity of the apparatus, in the present instance, a total of twenty-one of the recorder-controller or recorder instruments and a multi-pen recorder unit.

FIG. 8 shows a simple patch cord arrangement wherein the "increase" instructor jack is connected to the "increase" motor field of the No. 10 instrument by a jumper wire 210 and the "decrease" instructor jack is connected to the corresponding "decrease" motor field by a jumper wire 211, both jumper wires being at the back of the patchboard 38 so that conductors plugged into the corresponding jacks at the face of the patchboard are connected electrically by way of the jumper wires. In this arrangement only the instructor's control switch 28 of the "increase" and "decrease" motors of the No. 10 instrument would be operative, not the operator's or trainee's controls which are located at the instrument itself. The jumper wires are shown in full lines in FIGS. 8 through 15 even though they are located behind the patchboard. This showing is diagrammatic and is employed for simplicity and clarity.

Of course in the case of recorder instruments 25 which do not provide for operator or trainee control the arrangement of FIG. 8 would provide a complete manual control connection for a single instrument 25. FIG. 9 shows a patch cord arrangement similar to FIG. 8 excepting that the two patch cords from the instructor jacks of instrument No. 1 are connected to the motor field jacks of instrument No. 10 by conductors 212 and 213 whereby instructor's switch No. 1 may be used to control the "increase" and "decrease" motors of instrument No. 10.

FIG. 10 shows a patch cord connection arrangement wherein either the trainee or the instructor switches may control the "increase" and "decrease" motors of a given instrument and this is effected simply by connecting both the operator's or trainee's "increase" jack and the instructor's "increase" jack to the "increase" motor field jack as by jumper wires 214 and 215 and making equivalent connections between the three corresponding "decrease" jacks as by jumper wires 216 and 217.

In the arrangement of FIG. 10 if the instructor's control switch is actuated opposite to an actuation of the trainee's switch, movement of the pointer of the instrument will be blocked. This technique is used in connection with more complex circuitry such as parallel instrument control or various cascade controls and may at any time be employed by the instructor to cancel or neutralize an incorrect or improper control impulse on the part of the trainee.

FIG. 11 shows a patch cord arrangement wherein either the instructor or operator may control the No. 1 instrument from the No. 1 position. This much of the patch cord arrangement is the same as that shown for instrument No. 4 in FIG. 10 and the jumper wires are identified by like numerals. In addition, patch cords 220 and 221 connect the "increase" motor field of instrument No. 1 with "increase" motor field of instrument No. 5 and the "decrease" motor field of instrument No. 1 with "decrease" motor field of instrument No. 5, respectively.

Accordingly, operation of either the "increase" or "decrease" switches of instrument No. 1 by either the instructor or the trainee will produce simultaneous operation of the corresponding motors of instruments Nos. 1 and 5. In addition, the instructor jacks of instrument No. 5 are connected to the corresponding motor jacks of instrument No. 5 by jumper wires 222 and 223 so that the instructor may simultaneously operate instruments No. 1 and 5 from either his No. 1 or No. 5 control switch. In this instance the No. 1 instrument would necessarily be a recorder controller 22 since it provides trainee control whereas the No. 5 instrument may be a recorder 25 which does not include trainee control switches.

We come now to a situation wherein it is desired that the indicator of one instrument move in parallel relationship with any movement of the indicator of another instrument but wherein movement of the one instrument is not reflected in movement of the other. More specifically, and referring to FIG. 11 by way of example, suppose that the indicator of instrument No. 5 is to move in parallel relationship with any movement of the indicator of instrument No. 1 but movement of instrument No. 5 is not to be reflected in a corresponding movement of instrument No. 1. In these circumstances, the cascade portion of the patchboard is employed whereby the control impulses are transmitted in part through electrical relays.

In FIG. 12 the patchboard jacks corresponding to instrument No. 1 are interconnected the same as in the case of FIG. 11 by jumper wires 214 through 217 to provide either instructor or trainee control of instrument No. 1. Also instrument No. 5 is connected for instructor control by jumper wires 222 and 223 as in FIG. 11.

In addition to this, patch cords 226 and 227 connect the instructor's "increase" and "decrease" jacks to the "increase" relay coil jack 201 and a corresponding "decrease" relay coil jack 230 of the cascade circuitry whereby relay electromagnets corresponding to the electromagnet 204 of FIG. 7 are energized whenever the No. 1 instructor's switch is moved to either an "increase" or "decrease" position.

Two additional jumper wires or patch cords 232 and 233 connect one side of each of the two relay switches 202 which are closable by energization of the two above-mentioned electromagnets 204 to the "increase" and "decrease" jacks of the No. 5 instrument, the other side of each of these relay switches being connected to the power supply as described previously herein.

From the foregoing it will be seen that closure of the No. 1 instrument control switches by either the instructor or the trainee will operate the corresponding motor of the No. 1 instrument and will also energize either the "increase" or "decrease" coils in the No. 1 row of the cascade circuitry, these coils being identified at 204 in FIG. 7. Note that if the trainee operates his control switch for the No. 1 instrument he will likewise operate the corresponding relay through either of the jumper wires 215 or 217 and the corresponding jumper wires 226 or 227.

This closure of the two related relay switches 202 activates the corresponding "increase" or "decrease" motor of the No. 5 instrument by way of the conductors 232 or 233. However, if the instructor actuates the "increase" or "decrease" motors of the No. 5 instrument by manipulation of his corresponding No. 5 switch through either of the jumper wires 222 or 223, the implse will not be transmitted to the No. 1 instrument since neither of the relay coils 204 just referred to would then be energized and the jumper wires 232 and 233 would merely be in connection with one side of each of the open switches 202 of such relays.

Thus means are provided for effectively preventing feedback of a signal from the instructor's console switch for instrument No. 5 going through the motor of instrument No. 5 to the motor of instrument No. 1. In this hookup it is possible for the instructor to block the movement of instrument No. 5 that would normally result from the trainee's actuation of the control switch 158 on the No. 1 instrument. This is accomplished by actuating the instructor's switch 28 corresponding to the No. 5 instrument in the opposite direction from the trainee's movement of the switch 158 of the No. 1 instrument. This blocks the No. 5 instrument against movement but instrument No. 1 will move properly in response to the trainee's manipulation of switch 158 of the No. 1 instrument.

Reference will now be had to FIG. 13 which shows a slightly more complex relationship wherein one instrument functions as a master over two or more slave instruments. The hookup of the jumper wires in FIG. 13 is the same as that in FIG. 12 with respect to the connections made by jumper wires 214 through 217, 222 and 223, and the connections 226 and 227 from the instructor's switch 28 of the No. 1 instrument to the cascade or isolation circuitry relay actuating coils. In FIG. 13 the jumper wires 232 and 233 from the relay contacts to the No. 5 instrument motor operating jacks are likewise present. In addition to the above, jumper wires 238 and 239 connect from the remaining pair of contacts in the No. 1 column of the cascade or isolation circuitry (corresponding to switches 206 of FIG. 7) to the motor control jacks of the No. 8 instrument. However, in this instance the jumper wire 238 connects "decrease" contacts of the cascade circuitry to the motor "increase" jack of the No. 8 instrument and jumper wire 239 connects "increase contacts" of the cascade circuitry to the "decrease" jack of the No. 8 instrument.

With this arrangement the operation of the No. 1 and No. 5 instruments from the No. 1 and No. 5 controls is the same as in the case of the arrangement of FIG. 12. However, in addition, the No. 8 instrument will always move when the No. 1 instructor or trainee switches are operated but in an opposite direction to the No. 1 and No. 5 instruments. As shown in FIG. 13, instrument No. 8 can only operate as a slave to instrument No. 1 but in a reverse direction. Of course this modification is by way of illustration and the No. 8 instrument might in addition be provided with jumper wires from the No.

8 instrument jacks or both the instructor and trainee jacks of the No. 8 instrument by jumper wires similar to those designated 214 through 217 and 222 and 223. Due to the relay control relationship provided by the cascade circuitry such direct control of instrument No. 8 would have no feedback effect on the No. 1 and No. 5 instruments as explained above.

Processes to be represented on the trainer of the present invention may often present a condition wherein two master instruments must exercise control over a third instrument or slave under circumstances wherein there is no other relationship between the two master control instruments. Such a set of circumstances is provided for in the patch cord connection arrangement illustrated in FIG. 14 to which reference will now be had. Assume, by way of example, that instrument No. 1 represents a liquid level indicator controller having control over a flow recorder controller in the No. 5 position. Let us further assume that any movement of instrument No. 8 should also produce movement of instrument No. 5 but any movement of either instrument No. 1 or instrument No. 8 shall have no effect on each other. The circuitry connections of instruments Nos. 1, 5 and 8 and the necessary cascade or isolation circuits employed therewith to reproduce or represent the foregoing relationship will now be described with reference to FIG. 14. It will be noted that in this instance two of the cascade or isolation relay circuits are employed, namely those in the No. 1 and No. 2 columns of the cascade circuitry in FIG. 14.

As shown in FIG. 14 the No. 1 and No. 8 instruments are connected, respectively, for operation from the No. 1 and No. 8 instructor switches by patch cords designated 241, 242, 243 and 244 in FIG. 14. The No. 5 instrument is connected for operation from either the No. 5 trainee switch at the instrument or the No. 5 instructor switch by patch cords or jumper wires designated 245, 246, 247 and 248 in FIG. 14. In addition to the foregoing direct instrument connections the instructor's jacks of the No. 1 and No. 8 instruments are connected to the "increase" and "decrease" relay coils of the No. 1 and No. 2 cascade circuits, respectively, by jumper wires designated, respectively, by the numerals 251, 253, 254 and 255. Thus the No. 1 relays of the cascade circuit are energized when the No. 1 instrument instructor's switch is operated and the No. 2 relays are energized when the No. 8 instrument instructor's switch is operated.

To transmit the effect of this relay energization by the No. 1 and No. 8 instrument controls to the No 5 instrument the "increase" and "decrease" jacks of the No. 1 and No. 2 "increase" and "decrease" relays are joined by jumper wires 257 and 258 and these jacks are mutually connected to the "increase" and "decrease" motor jacks of the No 5 instrument by jumper wires designated 260 and 261, respectively.

With the foregoing isolation or cascade connections the No. 5 instrument will be operated in master and slave relationship when either the No. 1 or No. 8 instrument is operated and will also be itself operable by either the trainee or the instructor from the No. 5 switch 158 at the instrument or the No. 5 instructor's switch 28. Furthermore, operation of either of the No. 5 switches to move the No. 5 instrument will have no feedback effect on either the No. 1 or No. 8 instrument and operation of either the No. 1 or No. 8 instrument will have no effect on the other, even though both instruments produce duplicate movements on the No. 5 instrument.

As indicated previously herein and as shown at 31 in FIG. 1, the present apparatus is provided with six alarm devices which electrically indicate abnormal conditions by means of variously colored lights or by audible means or by audible means or by both visual and audible means. Connection of any of the several alarm units with any of the twenty-one instruments 22 or 25 requires only a single patchboard connection. The numerals from 1 to 12 along the lower line of patchboard 38 in FIG. 15 beginning at the left-hand side, designate twelve alarms but since only six are provided in the present instance, only the numbers from 1 through 6 are employed herein. Farther to the right along this bottom line are the numbers 1 through 4 after the designation "Misc. alarm sw," and these four jack may be connected to corresponding manual alarm control switches on the instructor's console 26 which have previously been referred to and designated 29 in FIG. 2.

If it be desired that the No. 2 alarm be connected for operation by the No. 6 instrument, then a patch cord designated 270 in FIG. 15 will be applied to connect the normally open alarm switch of the No. 6 instrument corresponding to the conductors 186 and 188 of FIG. 6, to the No. 1 alarm jack as shown in FIG. 15. If it be desired that a given alarm be controlled by the instructor a single patch cord connection likewise suffices. In FIG. 15 patch cord 271 connects the No. 2 manual alarm control switch of the instructor's console 26 to the No. 6 alarm unit.

The instruments 22 and 25 referred to herein may assume various forms and are not necessarily replicas in appearance of the actual instruments which they represent. The above description has concerned itself particularly with the functional aspects of the instruments and the manner in which they combine with each other and with other components of the apparatus. Various other forms of instrumental representations may be employed. For instance in the form of apparatus shown herein the instrument panel 20 is provided with a multi-pen recorder type indicator 275 which has three indicating members 276 each of which may be arranged to function in the same manner as any of the indicators 103 of the instruments 22 and 25. In the present instance the indicators of the multi-pen recorder type indicator are merely controlled from the instructor's console 26 by means of switches 277 in the same general way that the instructor's console switches 28 control the instruments 22 and 25.

The modified form of the apparatus illustrated generally in FIG. 16 is the same in design and function as that of the embodiment previously described excepting that the arrangement is modular or sectional so that a basic unit embodying a minimum number of instruments may be added to at will to expand the capacity as required. The full line showing in FIG. 16 illustrates a pair of basic module cabinets 280 and 281 connected in side-by-side relationship wherein the cabinet 280 includes an alarm annunciator panel 282 which in the present instance has a capacity for a total of eight alarm units 283 and cabinet 280 accommodates four instruments corresponding to the instruments 22 and 25 of the preceding embodiment. In FIG. 16 the instrument positions are shown at 285. The second cabinet 281 is provided to add an additional six instrument positions 286 corresponding to the four instrument positions 285 of cabinet 280.

Merely by way of example, the dot and dash extensions in FIG. 16 indicate a further modular or sectional addition 281 likewise having six instrument positions 286 and a pair of modular sections 287 each of which embodies a pair of the multi-pen recorders 275 described previously in connection with the embodiment as illustrated in FIG. 1.

In FIG. 16 a display panel 290 is provided for the two basic instruments 280 and 281 and other wider display panels may be employed as indicated in dot and dash lines as additional units or modules are added. In a similar manner, additional units or sections may be added to instructors' consoles and patchboard devices which are initially furnished in a basic minimum size and are thus expandible in capacity in accordance with expansion of the instrument support structure.

We claim:

1. Personnel training apparatus comprising a plurality of interchangeable indicating devices each having an indicator element movable in opposite directions and motor means for moving said indicator element in either direction, each indicating device having electrical conductor means extending therefrom for energizing said motor means, each of said plurality of devices having a pair of manual switches for use by an instructor and a trainee for alternatively energizing said motor means, a multiple electrical connector programming device, a remote control console including one of said pair of manual switches for each of said indicating devices and flexible conductor means leading from said console switches to said programming device, said programming device having a set of electrical terminals corresponding to each of said indicating devices, each set of electrical terminals including terminal means for said indicating device motor means, terminal means for said indicating device remote control manual switch, terminal means for the other manual switch of said indicating device, and conductor means selectively connectible between any of said manual switch means and the terminal means of any of said indicating device motor means.

2. Personnel training apparatus comprising a plurality of interchangeable indicating devices each having an indicator element movable in opposite directions and motor means for moving said indicator element in either direction, a support having a plurality of indicating device receiving positions for interchangeably receiving and supporting a variable desired number of indicating devices in various positional arrangements, each indicating device having electrical conductor means extending therefrom for energizing said motor means, each of said plurality of devices having a pair of manual switches for use by an instructor and a trainee for alternatively energizing said motor means, a multiple electrical connector programming device, a remote control console including one of said pair of manual switches for each of said indicating devices and flexible conductor means leading from said console switches to said programming device, said programming device having a set of electrical terminals corresponding to each of said indicating devices, each set of electrical terminals including terminal means for said indicating device motor means, terminal means for said indicating device remote control manual switch, and terminal means for the other manual switch of said indicating device and patch cord means for interconnecting any of said manual switch terminal means with the terminal means of any of said indicating device motor means.

3. Personnel training apparatus comprising a plurality of interchangeable indicating devices each having an indicator element movable in opposite directions and motor means for moving said indicator element in either direction, a support having a plurality of indicating device receiving positions for interchangeably receiving and supporting a variable desired number of indicating devices in various positional arrangements, each indicating device having electrical conductor means extending therefrom for energizing said motor means, each of said plurality of devices having a pair of manual switches for use by an instructor and a trainee for alternatively energizing said motor means, a multiple electrical connector programming device, a remote control console including one of said pair of manual switches for each of said indicating devices and flexible conductor means leading from said console switches to said programming device, said programming device having a set of electrical terminals corresponding to each of said indicating devices, each set of electrical terminals including terminal means for said indicating device motor means, terminal means for said indicating device remote control manual switch means, and terminal means for the other manual switch means of said indicating device, a plurality of electrical relays each including an electromagnet and switch means closable thereby, electromagnet terminal means and relay switch terminal means on said programming device, and conductor means for connecting any of said remote control switch terminal means to any of said electromagnet terminal means and for connecting corresponding relay switch terminal means to the terminal means of any of said motor means.

4. Personnel training apparatus comprising a plurality of interchangeable indicating devices each having an indicator element movable in opposite directions and motor means for moving said indicator element, each indicating device having electrical conductor means extending therefrom for energizing said motor means, at least some of said plurality of devices having manual switch means thereon for selectively energizing said motor means for movement of said indicating element in either direction, a multiple electrical connector programming device, a remote control console having a manual control switch corresponding to each of said indicating devices and flexible conductor means leading from said console switches to said programming device, said programming device having a set of electrical terminals corresponding to each of said indicating devices, each set of electrical terminals including terminal means for said indicating device motor means, terminal means for said indicating device manual switch means, terminal means for the corresponding remote control console manual switch, a plurality of electrical relays each including an electromagnet and switch means operable thereby, electromagnet terminal means and relay switch terminal means, and conductor means for connecting any of said remote control switch terminal means to any of said electromagnet terminal means, and for connecting corresponding relay switch terminal means to the terminal means of any of said motor means.

5. Personnel training apparatus comprising a plurality of interchangeable indicating devices each having an indicator element movable in opposite directions and motor means for moving said indicator element, a supporting having a plurality of indicating device receiving positions for interchangeably receiving and supporting a variable desired number of indicating devices in various positional arrangements, each indicating device having electrical conductor means extending therefrom for energizing said motor means, at least some of said plurality of devices having a manual switch thereon for selectively energizing said motor means for movement of said indicating element in either direction, a multiple electrical connector programming device, a remote control console having a manual control switch corresponding to each of said indicating devices and flexible conductor means leading from said console switches to said programming device, said programming device having a set of electrical terminals corresponding to each of said indicating devices, each set of electrical terminals including terminal means for said indicating device motor means, terminal means for said indicating device manual switch means, terminal means for the corresponding remote control console manual switch, a plurality of electrical relays each including an electromagnet and switch means closable thereby, terminal means for each of said relay electromagnets and each of said relay switches, and patch cord means for connecting any of said manual switch means with any of said motor terminal means or any of said relay electromagnet terminal means and for connecting any of said relay switch means with any of said motor terminal means.

6. Personnel training apparatus comprising a plurality of interchangeable indicating devices each having an indicator element movable in opposite directions and motor means for moving said indicator element, each indicating device having electrical conductor means extending therefrom for energizing said motor means, at least some of said plurality of devices having a manual switch thereon for selectively energizing said motor means for movement of said indicating element in either direction, a multiple electrical connector programming device, a remote control console having a manual control switch corresponding to each of said indicating devices and flexible conductor means leading from said console switches to said programming device, said programming device having a set of electrical terminals corresponding to each of said indicating devices, each set of electrical terminals including terminal means for said indicating device motor means, terminal means for said indicating device manual switch means, terminal means for the corresponding remote control console manual switch, a plurality of electrical relays each including an electromagnet and switch means closable thereby, terminal means for each of said relay electromagnets and each of said relay switches, and patch cord means for connecting any of said manual switch means with any of said motor terminal means or any of said relay electromagnet terminal means and for connecting any of said relay switch means with any of said motor terminal means.

7. Personnel training apparatus comprising a plurality of interchangeable indicating devices each having an indicator element movable in opposite directions and motor means for moving said indicator element, a support having a plurality of indicating device receiving positions for interchangeably receiving and supporting a variable desired number of indicating devices in various positional arrangements, each indicating device having electrical conductor means extending therefrom for energizing said motor means, at least some of said plurality of devices having a manual switch thereon for selectively energizing said motor means for movement of said indicating element in either direction, a remote control console having a manual control switch corresponding to each of said indicating devices and flexible conductor means leading from said console switches to said support, and connection means comprising a set of electrical terminals corresponding to each of said indicating devices, each set of electrical terminals including terminal means for said indicating device motor means, terminal means for said indicating device manual switch means, and terminal means for the corresponding remote control console manual switch, and means for interconnecting any of said manual switch terminal means with the terminal means of any of said indicating device motor means.

8. Personnel training apparatus comprising a plurality of interchangeable indicating devices each having an indicator element movable in opposite directions and motor means for moving said indicator element, a support having a plurality of indicating device receiving positions for interchangeably receiving and supporting a variable desired number of indicating devices in various positional arrangements, each indicating device having electrical conductor means extending therefrom for energizing said motor means, at least some of said plurality of devices having a manual switch thereon for selectively energizing said motor means for movement of said indicating element in either direction, a remote control console having a manual control switch corresponding to each of said indicating devices and flexible conductor means leading from said console switches to said support, and connection means comprising a set of electrical terminals corresponding to each of said indicating devices, each set of electrical terminals including terminal means for said indicating device motor means, terminal means for said indicating device manual switch means, and terminal means for the corresponding remote control console manual switch, means for interconnecting any of said manual switch terminal means with the terminal means of any of said indicating device motor means, and a plurality of electrical relays each including an electromagnet and a relay switch operable thereby, and means for interconnecting any of said manual switches with any of said electromagnets and for interconnecting any of said relay switches with any of said motor terminal means.

9. Personnel training apparatus comprising a plurality of interchangeable indicating devices each having an indicator element movable in opposite directions and motor means for moving said indicator element, a support having a plurality of indicating device receiving positions for interchangeably receiving and supporting a variable desired number of indicating devices in various positional arrangements, each of said indicating devices having alarm switch means operable to indicate movement of said indicating element to a predetermined position, each indicating device having electrical conductor means extending therefrom for energizing said motor means and other conductor means extending from said alarm switch, a multiple electrical connector programming device, a remote control console having a manual control switch corresponding to each of said indicating devices and flexible conductor means leading from said console switches to said programming device, an electrically operable alarm device, said programming device having a set of electrical terminals including terminal means for said indicating device motor means, terminal means for the corresponding remote control console manual switch, and terminal means for said alarm switch means, and conductor means for interconnecting any of said remote control switch terminal means with the motor terminal means of any of said indicating devices and for connecting any of said alarm switch terminal means with said alarm device.

10. Personnel training apparatus comprising a plurality of interchangeable indicating devices each having an indicator element movable in opposite directions and motor means for moving said indicator element, a support having a plurality of indicating device receiving positions for interchangeably receiving and supporting a variable desired number of indicating devices in various positional arrangements, each of said indicating devices having alarm switch means operable to indicate movement of said indicating element to a predetermined position, each indicating device having electrical conductor means extending therefrom for energizing said motor means and other conductor means extending from said alarm switch, a multiple electrical connector programming device, a remote control console having a manual control switch corresponding to each of said indicating devices and a manual alarm control switch, and flexible conductor means leading from said console switches to said programming device, an electrically operable alarm device, said programming device having a set of electrical terminals including terminal means for said indicating device motor means, terminal means for the corresponding remote control console manual switch, and terminal means for said alarm switch means, and conductor means for interconnecting any of said remote control switch terminal means with the motor terminal means of any of said indicating devices and for connecting any of said alarm switch terminal means and said remote control console alarm switch with said alarm device.

11. Personnel training apparatus comprising a plurality of interchangeable indicating devices each having an indicator element movable in opposite directions and motor means for moving said indicator element, a support having a plurality of indicating device receiving positions for interchangeably receiving and supporting a variable desired number of indicating devices in various positional arrangements, each indicating device having electrical conductor means extending therefrom for energizing said motor means, an electrically operable alarm device, a multiple electrical connector programming device, a remote control console having a manual control switch corresponding to each of said indicating devices and said alarm device and flexible conductor means leading from said console switches to said programming device, said programming device having a set of electrical terminals including terminal means for said indicating device motor means, terminal means for the corresponding remote control console manual switch, and terminal means for said remote control console alarm switch, and conductor means for interconnecting any of said remote control switch terminal means with the motor terminal means of any of said indicating devices and for connecting said alarm switch terminal means with said alarm device.

12. Personnel training apparatus comprising a plurality of interchangeable indicating devices, each having an indicator element movable in opposite directions and motor means for moving said indicator element in either direction, a support having a plurality of indicating device receiving positions for interchangeably receiving and supporting a variable desired number of indicating devices in various positional arrangements, each indicating device having energy conductor means extending therefrom for activating said motor means, each of said plurality of devices having a pair of manual control members for use by an instructor and a trainee for alternatively energizing said motor means, a multiple connector programming device, a remote control console including one of each of said pairs of control members and flexible energy conductor means leading from said console control members to said programming device, said programming device having a set of power connectors corresponding to each of said device motor means and for each of said indicating device remote control members, and conductor means for interconnecting any of said control members with the power connectors of any of said indicating device motor means.

References Cited in the file of this patent
UNITED STATES PATENTS

| | | |
|---|---|---|
| 2,043,904 | Pierce | June 9, 1936 |
| 2,173,400 | Shaw | Sept. 19, 1939 |
| 2,495,531 | Lederer | Jan. 24, 1950 |
| 3,001,171 | Schultz | Sept. 19, 1961 |
| 3,028,573 | Stoehr | Apr. 3, 1962 |
| 3,061,945 | Hawkins | Nov. 6, 1962 |